United States Patent [19]

Kurata et al.

[11] Patent Number: 4,494,152

[45] Date of Patent: Jan. 15, 1985

[54] CHARACTER AND IMAGE DATA READING SYSTEM

[75] Inventors: Masami Kurata; Takashi Ohmori, both of, Kanagawa, Japan

[73] Assignee: Fuji Xerox Co., Ltd., Tokyo, Japan

[21] Appl. No.: 332,778

[22] Filed: Dec. 21, 1981

[30] Foreign Application Priority Data

Jan. 12, 1981 [JP] Japan .................................. 56-2121

[51] Int. Cl.³ .............................................. H04N 1/10
[52] U.S. Cl. ..................................... 358/293; 358/291
[58] Field of Search ............... 358/113, 213, 293, 294, 358/288

[56] References Cited

U.S. PATENT DOCUMENTS 4,222,065 9/1980 Pusch ................................... 358/113
4,321,629 3/1982 Ogasawara ......................... 358/293

OTHER PUBLICATIONS

R. H. Dyck et al. "A New Self-Scanned Photodiode Array " Solid State Technology / Jul. 1971.

Primary Examiner—John C. Martin
Assistant Examiner—Edward L. Coles
Attorney, Agent, or Firm—Sughrue, Mion, Zinn, Macpeak, and Seas

[57] ABSTRACT

A character and image data reading system for a character and image data reading apparatus has an auxiliary scanning mechanism which moves an original relative to a solid image pickup element in a stepwise manner by a predetermined distance during an integration period of the pickup element so that a light receiving window of the pickup element covers a region corresponding to at least an auxiliary scanning width.

9 Claims, 11 Drawing Figures

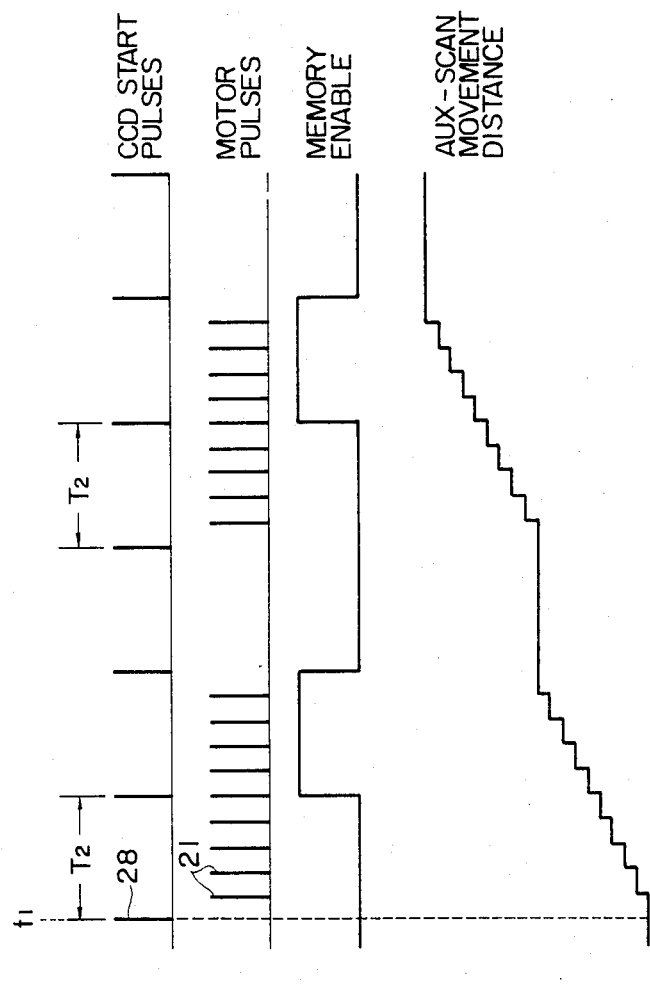

CHARACTER AND IMAGE DATA READING SYSTEM

BACKGROUND OF THE INVENTION

1. Field of the Invention

The present invention relates to a character and image data (hereinafter referred to as "character/image data") reading system for a character/image data reading apparatus using solid image pickup elements, in which character/image data can be completely picked up even when the intervals of scanning lines are relatively large.

2. Description of the Prior Art

In general, a facsimile is so designed that, among a variety of scanning line densities, an optimum one is selected according to the kind of an original. When a scanning line density is selected, a scanning width (or an auxiliary scanning direction movement distance) required between reading of character/image data for one line and reading of character/image data for the next line is determined according to the scanning line density thus selected. The scanning width is set by increasing or decreasing the number of steps of a step motor for moving an optical system or an original, after the character/image data of each line have been read. For instance, in the case when the scanning width is minimum (or the scanning line density is maximum), the main scanning is carried out every step of the step motor; and in the case where the scanning width is maximum (or the scanning line density is minimum), the main scanning is carried out every four (4) steps of the step motor.

FIG. 1 shows various signal waveforms in the case where a character/image data reading apparatus with a CCD (charge coupled device) reads character/image data for one line every four steps of a step motor. When four motor pulses 11 for driving the step motor are produced as shown in FIG. 1(B) and the auxiliary scanning covers a distance corresponding to four steps as shown in FIG. 1(D), the movement in the auxiliary scanning direction is stopped and a start pulse 12 as shown in FIG. 1(A) is applied to the CCD, whereupon the CCD starts accumulating character/image data in the image accumulation region. In a time $T_1$ (which is the character/image data accumulation time) the memory is enabled, so that the character/image data accumulated in the CCD is written into the memory. Thereafter, similarly as in the above-described case, character/image data for one line are read every four steps of the step motor.

It is assumed that the auxiliary scanning width is represented by A and the length, in the auxiliary scanning direction, of the light receiving window of the CCD is represented by B as shown in FIG. 2. In the case where reading character/image data ($S_0$, $S_1$, . . . ) for a line is carried out every four steps of the step motor, there is always a region C whose character/image data are not read unless the line density in the main scanning direction is changed according to the change of line density in the auxiliary scanning direction. Thus, the conventional character/image data reading system using solid image pickup elements suffers from a problem that, when the scanning lines are coarse in interval, character/image data cannot be completely picked up.

SUMMARY OF THE INVENTION

In view of the foregoing, an object of this invention is to provide a character/image data reading system for a character/image data reading apparatus using solid image pickup elements, in which character/image data can be completely picked up.

According to the invention, while the solid image pickup element is reading character/image data, the solid image pickup element is moved in the auxiliary scanning direction relative to the original until the light receiving window of the solid image pickup element covers a region corresponding at least to the auxiliary scanning width. It will be understood by those having ordinary skill in the art that the present invention may be practiced either by moving the optical system or the original to establish relative motion between the two.

BRIEF DESCRIPTION OF THE DRAWINGS

FIG. 4 is a waveform diagram showing various signals in the apparatus in FIG. 3.

DESCRIPTION OF THE PREFERRED EMBODIMENTS

This invention will be described with reference to its preferred embodiment.

Figure 1:
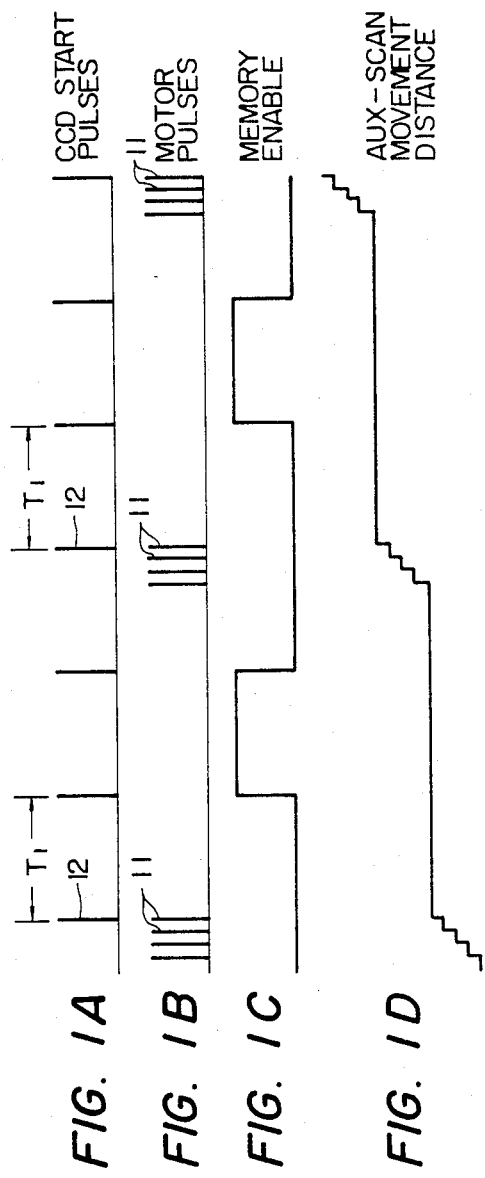
FIG. 1 is a waveform diagram showing various signals in a character/image data reading apparatus for a description of a conventional character/image data reading system.
Figure 2:
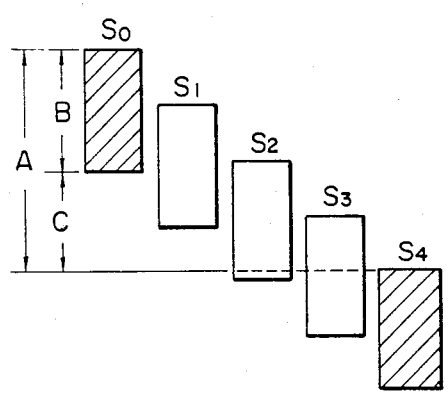
FIG. 2 is an explanatory diagram for describing why character/image data cannot be completely picked up in the conventional system.
Figure 3:
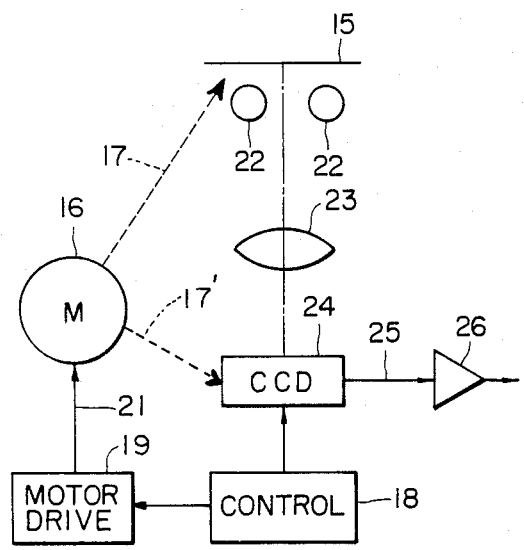
FIG. 3 is a schematic diagram showing the arrangement of a character/image data reading apparatus according to an embodiment of the present invention.

FIG. 3 shows the arrangement of a character/image data reading apparatus according to an embodiment of the present invention. An original 15 is moved in the auxiliary scanning direction by the mechanical force 17 of a step motor 16. Alternatively, step motor 16 may move light receiving window of CCD 24 relative to the original 15, as depicted by dotted line 17'. The step motor 16 is driven by motor pulses 21 which are outputted by a motor drive circuit 19 under the control of a control circuit 18. The reading region of the original 15 is illuminated by fluorescent lamps 22. Light reflected from the original is applied through a lens 23 to a CCD 24, so that the optical image of the reading region is formed on the CCD 24. Under the control of the control circuit, the CCD 24 subjects the optical image to integration, thereby to output character/image data 25. After being amplified by a preamplifier 26, the character/image data 25 are applied to a circuit such as for instance a signal processing circuit.

In order to allow the light receiving window of the CCD 24 to cover an auxiliary scanning width entirely no matter what auxiliary scanning width is selected for the character/image data reading apparatus, the step width of the motor 16 is made very small, and the original 15 is moved stepwise in the auxiliary scanning direction even during the integration time of the CCD.

A character/image data reading system in the case where the original is scanned in the auxiliary scanning direction as much as one line using nine (9) steps of the step motor will be described with reference to FIGS. 4 and 5.

It is assumed that the control circuit 18 produces a start pulse 28 (FIG. 4(A)) at the time instant t₁ in FIG. 4. The CCD 24 accumulates the optical image for an integration time beginning from the time instant t₁. On the other hand, the motor drive circuit 19 provides nine (9) motor pulses with a predetermined period from the time instant t₁. In response to the motor pulse 21 thus produced, the original 15 is moved stepwise in the auxiliary scanning direction. FIG. 4(D) shows the original movement distance in the auxiliary scanning direction.

Figure 5:
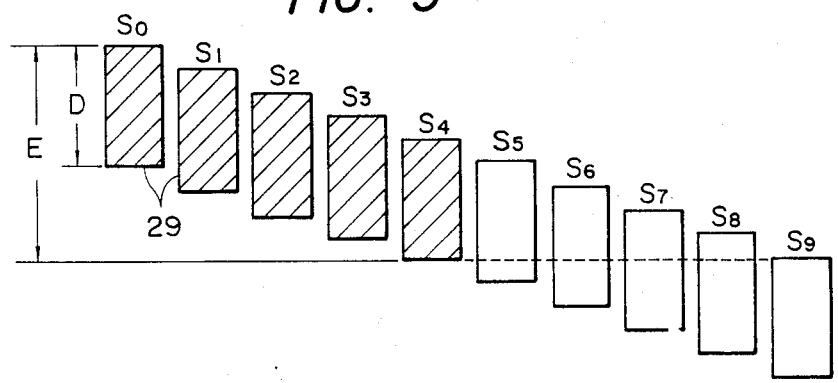
FIG. 5 is an explanatory diagram for a description of a method of picking up character/image data according to the present invention.

In this connection, it is assumed that the light receiving window of the CCD has a length D in the auxiliary scanning direction, and the scanning width is represented by E (however, E>D), as shown in FIG. 5. In the embodiment, the original is moved as much as one scanning width with nine steps ($S_1$ through $S_9$) of the step motor 16. Therefore, the light receiving window 29 covers one scanning width with a predetermined number of steps which can be obtained from the relation between the length D and the scanning width E. Accordingly, in order that the character/image data are completely picked up in this case, the step motor 16 should be driven at least four steps in the integration time $T_2$. The character/image data reading range in this case is indicated by oblique lines in the light receiving window 29 in FIG. 5. On the other hand, in order to completely read the character/image data of the succeeding scanning line, it is necessary that the number of steps of the step motor 16 during the integration time $T_2$ be eight (8) or smaller in this case.

Based on this requirement, the number of motor pulses 21 produced during the integration time $T_2$ in FIG. 4 is determined. That is, when five motor pulses 21 have been produced after the provision of the start pulse 28, the integration time $T_2$ is ended and the memory is enabled as shown in FIG. 4(C). Under this condition, the character/image data in the region indicated by the oblique lines in FIG. 5 are supplied, in the form of integrated data, to the memory. Thereafter, the step motor 16 is driven four steps continuously, so that the CCD's light receiving window is set at the start position of the next auxiliary scanning region. Thereafter, similarly as in the above-described case, character/image data with respect to each auxiliary scanning width is read.

As is apparent from the above description, according to the invention, the solid image pickup elements are moved in the auxiliary scanning direction relative to the original while reading character/image data, whereby the integration value of the character/image data is obtained. Therefore, it is unnecessary to provide a plurality of solid image pickup elements different in the light receiving window area, and character/image data can be completely picked up no matter what auxiliary scanning width is given.

We claim:

1. A character and image data reading system for a character and image data reading apparatus, comprising:
   a solid image pickup element having a light receiving window for reading character and image data therethrough; and
   an auxiliary scanning mechanism for moving said light receiving window releative to an original by a predetermined distance during an integration period of said solid image pickup element, and predetermined distance being equal to or longer than a first calculated length which is obtained by subtracting a length in the auxiliary scanning direction of said light receiving window from an auxiliary scanning width for one line and said predetermined distance being shorter than said auxiliary scanning width for one line;
   said solid image pickup element reading chaacter and image data while said light receiving window is being moved in the auxiliary scanning direction, when said first calculated length in the auxiliary scanning direction of said light receiving window is shorter than the auxiliary scanning width for one line; and,
   memory means for receiving character and image data read by said solid image pickup element during said integration period.

2. The character and image data reading system claimed in claim 1 wherein said auxiliary scanning mechanism moves said light receiving window relative to said original in a stepwise manner in the auxiliary scanning direction.

3. The character and image data reading system claimed in claim 2 wherein after said integration period terminates and before a subsequent integration period of said solid image pickup element begins, said auxiliary scanning mechanism moves said light receiving window relative to said original in a stepwise manner by a second calculated length which is equal to said auxiliary scanning width minus said first calculated length.

4. The character and image data reading system claimed in claim 3 wherein said auxiliary scanning mechanism comprises a step motor, a step motor drive circuit which produces motor pulses to control said step motor, and a control circuit for controlling said step motor drive circuit.

5. The character and image data reading system claimed in claim 4 wherein said solid image pickup element is a charge coupled device.

6. The character and image data reading system claimed in claim 5 further comprising four lamps for illuminating a reading region of said original and a lens for focusing light reflected from said reading region onto said light receiving window.

7. A character and image data reading system for a character and image data reading apparatus, comprising:
   a solid image pickup element having a light receiving window for reading character and image data therethrough; and
   an auxiliary scanning mechanism for moving an original relative to said light receiving window by a predetermined distance during an integration period of said solid image pickup element, said predetermined distance being equal to or longer than a first calculated length which is obtained by subtracting a length in the auxiliary scanning direction of said light receiving window from an auxiliary scanning width for one line and said predetermined distance being shorter than said auxiliary scanning width for one line;
   said solid image pickup element reading character and image data while said original is being moved in the auxiliary scanning direction, when said first calculated length in the auxiliary scanning direction of said original is shorter than the auxiliary scanning width of one line; and,
   memory means for receiving character and image data read by said solid image pickup element during said integration period.

8. The character and image data reading system claimed in claim 7 wherein said auxiliary scanning mechanism moves said original relative to said light receiving window in a stepwise manner in the auxiliary scanning direction.

9. The character and image data reading system claimed in claim 8 wherein after said integration period terminates and before a subsequent integration period of said solid image pickup element begins, and auxiliary scanning mechanism moves said original relative to said light receiving window in a stepwise manner by a second calculated length which is equal to said auxiliary scanning width minus said first calculated length.

* * * * *